(12) United States Patent
Jang

(10) Patent No.: US 9,413,219 B2
(45) Date of Patent: Aug. 9, 2016

(54) SYSTEM FOR CONTROLLING POWER-UP SEQUENCE USING DC/DC CONVERTER

(71) Applicant: Hyundai Mobis Co., Ltd., Seoul (KR)

(72) Inventor: Jeong Su Jang, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 14 days.

(21) Appl. No.: 14/266,885

(22) Filed: May 1, 2014

(65) Prior Publication Data

US 2015/0123639 A1    May 7, 2015

(30) Foreign Application Priority Data

Nov. 4, 2013   (KR) .......................... 10-2013-0132642

(51) Int. Cl.
| | |
|---|---|
| *G05F 1/67* | (2006.01) |
| *H02M 1/08* | (2006.01) |
| *H02M 1/36* | (2007.01) |
| *G06F 1/28* | (2006.01) |
| *H02M 1/00* | (2006.01) |

(52) U.S. Cl.
CPC . *H02M 1/08* (2013.01); *G06F 1/28* (2013.01); *H02M 1/36* (2013.01); *H02M 2001/009* (2013.01)

(58) Field of Classification Search
CPC ........... G05F 1/67; H02M 3/156; H02M 1/08; H02M 1/36; H02M 2001/0022; G06F 1/28; G01R 19/165; H03K 17/00
USPC .......................................... 323/272, 282, 299
IPC ......................................................... H02M 1/08
See application file for complete search history.

(56) References Cited

U.S. PATENT DOCUMENTS 6,121,760 A * 9/2000 Marshall ............... H02M 3/157
                                                                323/282
2012/0153992 A1   6/2012 Nogawa

OTHER PUBLICATIONS

Tutorial 1133 , © Jun. 27, 2002, Maxim Integrated Products, Inc. Multiple Voltage Systems Need Supply-Voltage Sequencing.*
German Office Action issued on Dec. 14, 2015 in counterpart German Patent Application No. 10 2014 210 881.0 (6 pages in English; 12 pages in German).

* cited by examiner

*Primary Examiner* — Yemane Mehari
(74) *Attorney, Agent, or Firm* — NSIP Law

(57) ABSTRACT

Disclosed is a system for controlling a power-up sequence applicable to a power controller of a lane departure warning system, including: one DC/DC converter unit configured to convert a first input voltage of input power and output the converted first input voltage as a first output voltage, and including four output terminals; and a comparator block unit including two comparators configured to monitor a state of the input power, and one or more comparators configured to generate a control signal for enabling a power output of a next sequence from the first output voltage.

16 Claims, 5 Drawing Sheets

SYSTEM FOR CONTROLLING POWER-UP SEQUENCE USING DC/DC CONVERTER

CROSS-REFERENCE TO RELATED APPLICATION

This application claims priority to and the benefit of Korean Patent Application No. 10-2013-0132642 filed in the Korean Intellectual Property Office on Nov. 4, 2013, the entire contents of which are incorporated herein by reference.

TECHNICAL FIELD

The present invention relates to a system for controlling a power-up sequence, and more particularly, to a system for controlling a power-up sequence applicable to a power controller of a lane departure warning system.

BACKGROUND OF THE INVENTION

Most of the methods of controlling a power-up sequence of a semiconductor device are to control an output sequence of each DC converter through software while including a separate processor (micom) for controlling power.

For example, the general method of controlling a power-up sequence includes a method of adjusting a power generation time by directly controlling an output of a DC converter as illustrated in FIG. 1, or a method of blocking or releasing a line of power supplied to a semiconductor device through a power switch (power MOSFET, and the like).

In the method of controlling a power-up sequence, a power control is implemented by software, so that an additional processor for controlling the software is demanded, and there is a problem in that an erroneous operation due to an error within a code or a problem during the processing of an operation is highly caused compared to a configuration of hardware.

Semiconductor devices, such as a memory, a micom, and an LCD, based on a transistor have a power-up sequence condition, and when the semiconductor devices do not keep the power-up sequence, there is a problem in that a latch-up phenomenon may be generated. The latch-up is a phenomenon in which an overcurrent flows in a transistor circuit unit, so that an on-state of the circuit is continuously maintained due to an unintentional parasitic circuit. When the latch-up is generated, an operation of a corresponding component may be stopped, or the corresponding component may have an erroneous operation.

SUMMARY OF THE INVENTION

The present invention has been made in an effort to provide a system for controlling a power-up sequence, which maintains an existing hardware control design concept and has a small size through one DC/DC converter in which four channel outputs are available.

The present invention has also been made in an effort to provide a system for controlling a power-up sequence, which is capable of monitoring a state of input power through a comparator.

An exemplary embodiment of the present invention provides a system for controlling a power-up sequence, including: one DC/DC converter unit configured to convert a first input voltage of input power and output the converted first input voltage as a first output voltage, and including four output terminals; and a comparator block unit including two comparators configured to monitor a state of the input power, and one or more comparators configured to generate a control signal for enabling a power output of a next sequence from the first output voltage.

The generation of the signal of the comparator receiving the first output voltage among the one or more comparators may be performed by outputting an output value HIGH when the first output voltage is applied to a positive (+) terminal by setting a negative (−) terminal of the comparator to have a voltage smaller than a reference voltage range of the first output voltage, re-inputting the output value HIGH to the DC/DC converter unit, and generating a control signal for enabling a power output of a next sequence.

When the first input voltage of the comparator is dropped to the reference voltage or lower, an under voltage signal may be LOW (0), so that it is determined that the state of the input power is abnormal through the comparator receiving the first input voltage among the two comparators which monitor the state of the input power.

When an output signal of the comparator is HIGH (1), it may be determined that the input power is normally input, when an output signal of the comparator is LOW (0), it may be determined that the input power exceeds the reference voltage input range through the comparator receiving a first output voltage.

According to the power-up sequence control system of the present invention, the number of components may be decreased through one DC/DC converter in which four channel outputs are available, thereby decreasing cost of a system and minimizing a size of the system.

It is also possible to handle a change in the power-up sequence without a large change in a circuit or a configuration, thereby improving re-usability and design reliability of the circuit.

A state of the input power may be monitored through the comparator, so that the monitored state may be utilized during a diagnosis of failure.

DETAILED DESCRIPTION OF THE EMBODIMENTS

Hereinafter, a power-up sequence control system according to an exemplary embodiment of the present invention will be described in detail with reference to the accompanying drawings.

Figure 1:
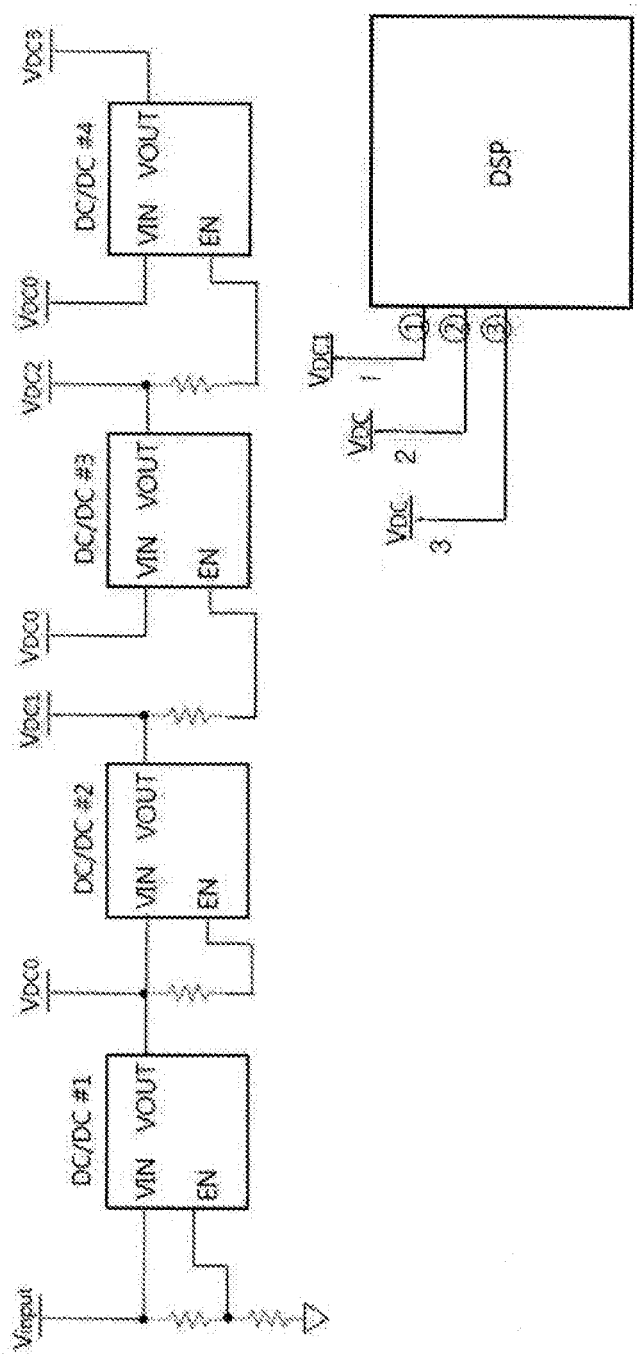
FIG. 1 is a circuit diagram illustrating a hardware control method of a lane departure warning system in the related art.
Figure 2:
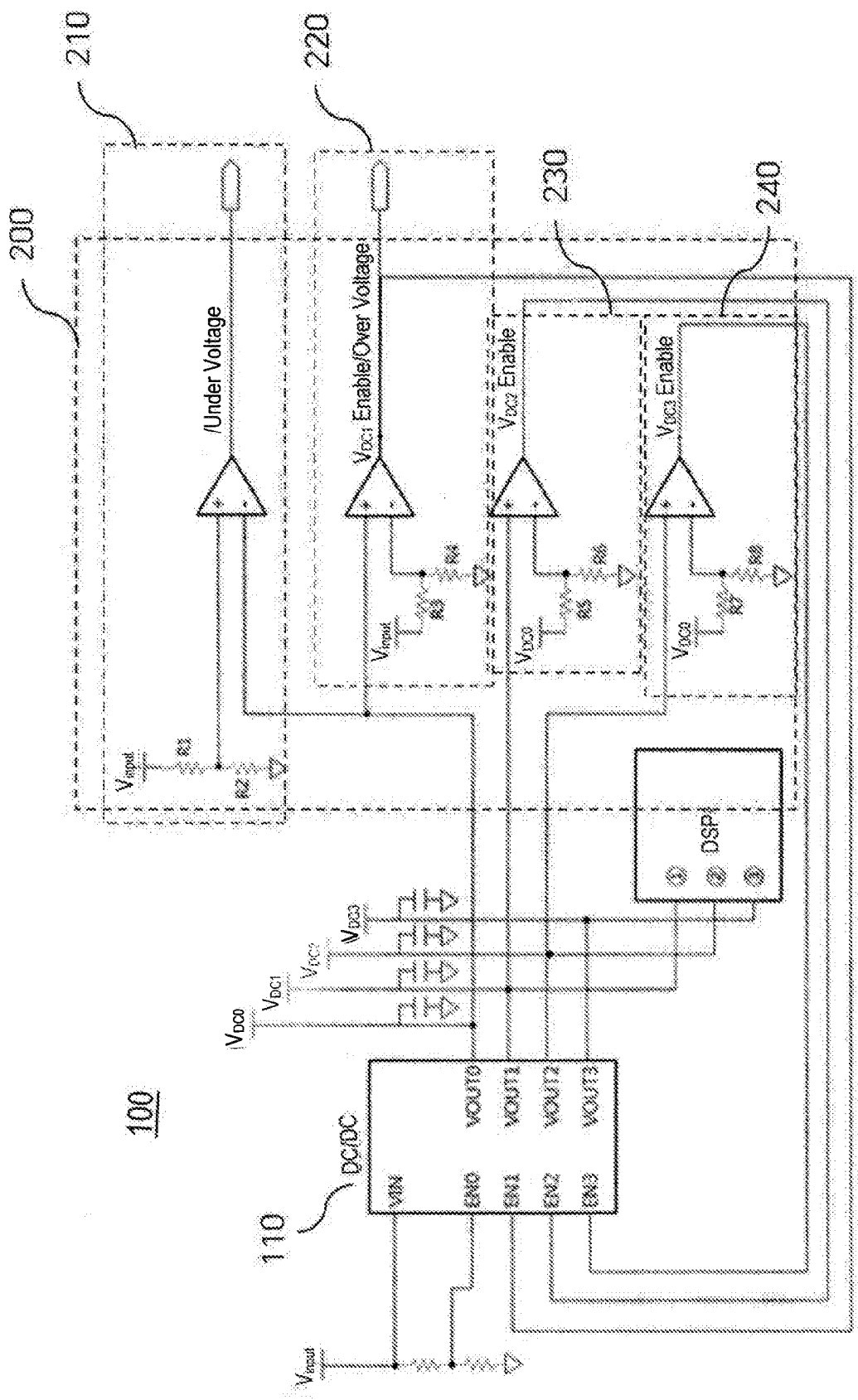
FIG. 2 is a circuit diagram illustrating a power-up sequence control system according to an exemplary embodiment of the present invention.

As illustrated in FIG. 2, a power-up sequence control system 100 according to the exemplary embodiment of the present invention includes a DC/DC converter unit 110 and a comparator block unit 200.

The DC/DC converter unit 110 is configured by changing respective DC/DC converters existing for generating a power-up sequence in the related art into one DC/DC converter in which four channel outputs are available.

In order to use only one DC/DC converter, a processor for controlling a voltage output enable signal in accordance with a sequence is necessary, but in the present invention, an existing hardware control design concept is maintained by utilizing a comparator.

In the present invention, a comparator 2 block unit 220, a comparator 3 block unit 230, and a comparator 4 block unit 240 are circuits for generating a signal for controlling a power-up sequence, and have the same signal generating method.

Figure 3:
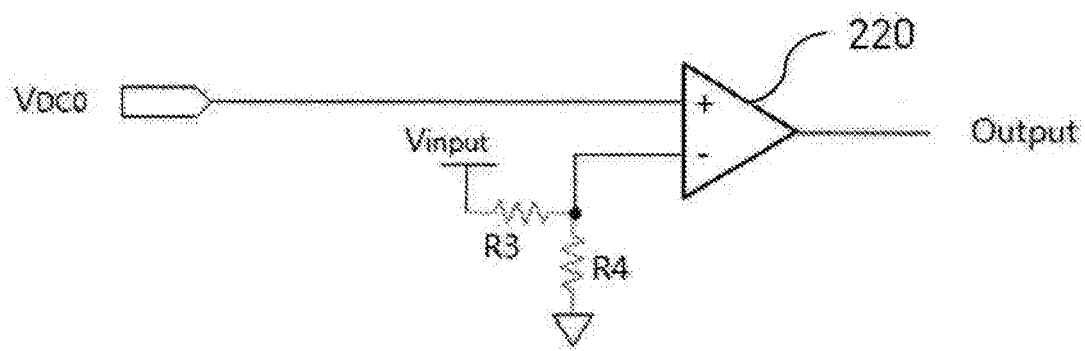
FIG. 3 is a block diagram illustrating a comparator of the power-up sequence control system.
Figure 4:
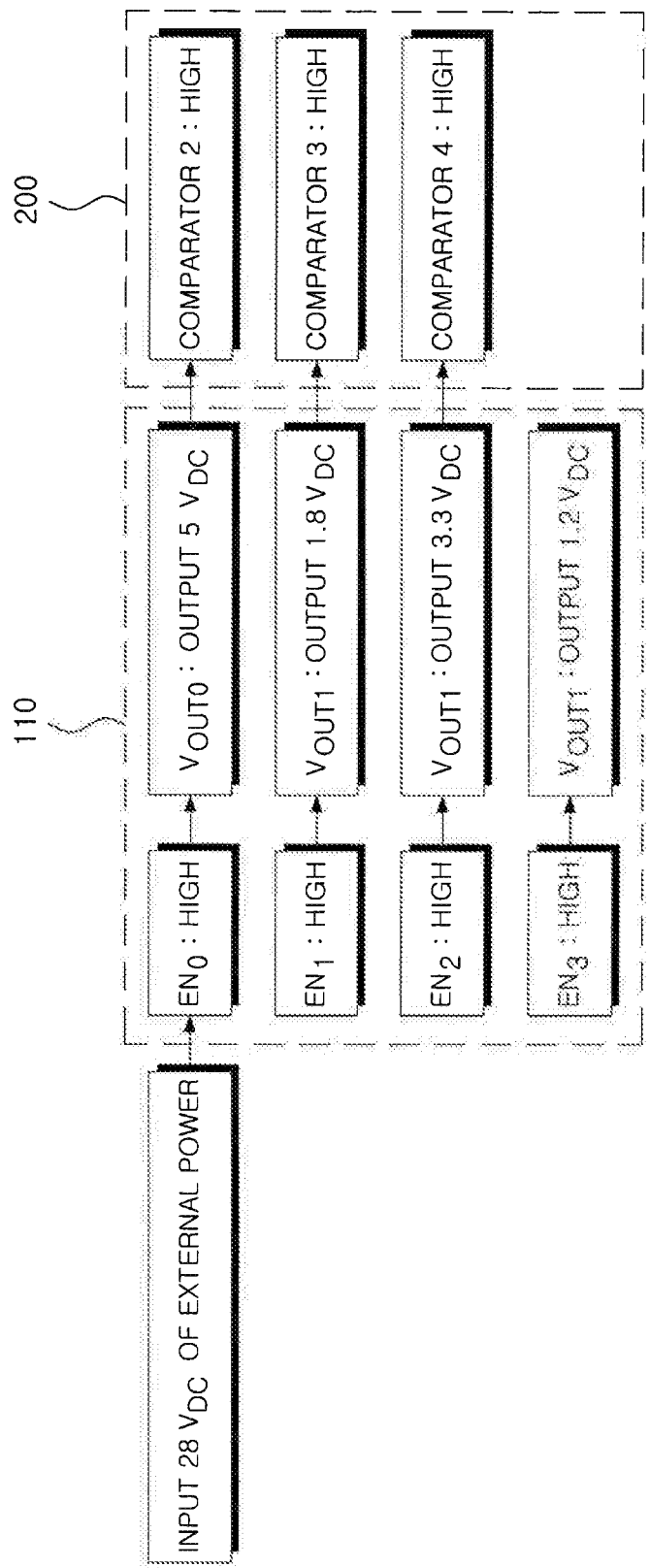
FIG. 4 is a diagram illustrating a flow of an operation of the power-up sequence control system.

The comparator 2 block unit 220 of FIG. 3 serves to confirm whether a voltage $V_{DC0}$ is output, and in this case, a negative (−) terminal of the comparator 2 is set to have a voltage smaller than a reference voltage range of $V_{DC0}$, so that when $V_{DC0}$ is applied to a positive (+) terminal, an output value HIGH is output. The output value HIGH is re-input to the DC/DC converter unit 110 to be a control signal for enabling a power output of a next sequence.

Here, a resistance value of the negative (−) terminal may be set by setting a reference of a minimum voltage of a voltage input to the positive (+) terminal to have a level appropriate for an environment of a device designed thereof.

For example, $V_{input}$ of a lane departure warning system is $12 V_{DC}$, and $V_{DC0}$ is $5 V_{DC}$, but when the system is configured to be operated based on accurately 5 V, an erroneous operation may be generated due to an error in a voltage level or induction of a noise during actual driving. Accordingly, when a circuit is configured by a device guaranteeing about 4.7 V or more considering a design margin, resistance values of $R_3$ and $R_4$ are calculated as expressed in Equation 1.

$$12 \times \{R_3/(R_3+R_4)\} < 4.7 \qquad \text{[Equation 1]}$$

To organize Equation 1, ($R_3 < 0.64 \times R_3$), and when $R_3$ is 100Ω, $R_4 < 64$.

Accordingly, a value smaller than 64Ω may be selected as a value of R4. The largest value among standard resistance values smaller than 64Ω is 63.4Ω, and as the resistance value is decreased, a determination reference voltage is decreased, so that resistance having the largest value while being close to the Equation needs to be selected if necessary.

$V_{DC1}$ and $V_{DC2}$ make a voltage enable signal having a next sequence through the comparator by using the same method.

That is, as illustrated in FIG. 3, in an operation flow of the power-up sequence control system, the power is controlled by repeating an operation in which when external power is applied, so that $EN_0$ becomes HIGH, $V_{OUT0}$ outputs $5 V_{DC}$, and an output of comparator 2 is HIGH, and the output of comparator 2 is applied to $EN_1$, and passes through the DC/DC converter and the comparator.

It is possible to monitor a state of input power by utilizing the comparator block unit 200, as well as to control the power-up sequence.

A state where input power $V_{INPUT}$ is equal to or smaller than a reference voltage (under voltage) or is larger than the reference voltage (over voltage) is monitored, and this function may be used for determining whether a power source has a problem during an analysis of failure, and may also be used as information for protecting the device from abnormal power.

Figure 5:
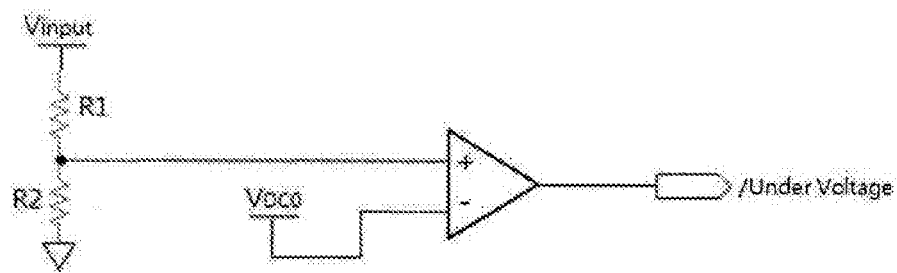
FIG. 5 is a block diagram illustrating the comparator for determining whether an input power is smaller than a reference voltage input range.
Figure 6:
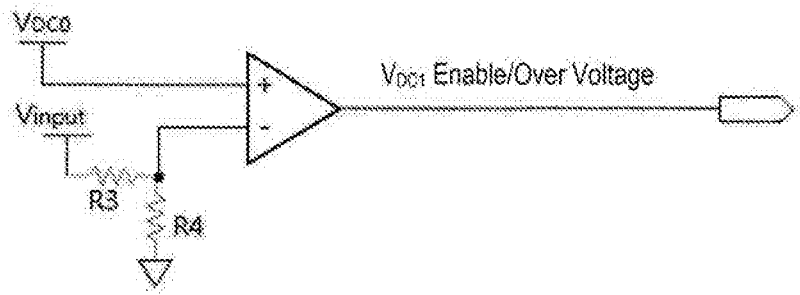
FIG. 6 is a block diagram illustrating the comparator for determining whether an input power is larger than the reference voltage input range.

The input power state monitoring is determined through the comparator 1 block unit 210 of FIG. 5 and the comparator 2 block unit 220 of FIG. 6.

The comparator 1 block unit 210 is a circuit unit for determining whether the input power is equal to or smaller than a reference voltage input range, and the comparator 2 block unit 220 is a circuit unit for determining whether the input power is larger than the reference voltage input range.

A rate voltage of the lane departure warning system is $12 V_{DC}$ and the range of the reference voltage is 9 to $16 V_{DC}$.

First, when the input power is dropped to be 9 V or lower during the determination of whether the input is smaller than the reference voltage input range, an under voltage signal becomes low, so that it may be determined that the power state is abnormal.

Here, a change in a voltage level is determined based on $V_{DC0}$ ($5 V_{CD}$), so that a size of the input power is also adjusted with a voltage level in accordance with the input power to be input to the comparator.

That is, as a condition for determining that the power state is abnormal, the system needs to be designed so that when the input power is equal to or larger than 9 V, a positive (+) terminal of comparator 1 is larger than $5 V_{DC}$ and when the input power is smaller than 9 V, a positive (+) terminal of comparator 1 is smaller than $5 V_{DC}$.

When a state where the input power is smaller than 9 V is set to 8 V considering a design margin, Equation 2 is obtained, and values of $R_1$ and $R_2$ may be determined through Equation 2.

$$8 \times \{R_2/(R_1+R_2)\} < 5 < 9 \times \{R_2/(R_1+R_2)\} \qquad \text{[Equation 2]}$$

To organize Equation 2, $5/9 < R_2/(R_1+R_2) < 5/8$.

Next, when it is determined whether the input power is larger than the reference voltage input range, it is determined that when an output signal is HIGH, $V_{DC0}$ is normally input, and when the output signal is LOW, the input power exceeds a normal range, and the first condition for the determination is that when $V_{DC0}$ is normally input, the output signal HIGH is output by setting a voltage of a negative (−) terminal of comparator 2 to be smaller than $VDC_0$.

The second condition for the determination is that when the input voltage is larger than 16 V, a voltage value of the negative (−) terminal is set to be a value larger than $V_{DC0}$, and when the input voltage is equal to or smaller than 16 V, a voltage value of the negative (−) terminal is set to be a value smaller than $V_{DC0}$.

When the input voltage is within the reference voltage range (16V or smaller), the negative (−) terminal always has a smaller value than $V_{DC0}$, so that when the second condition is satisfied, the first condition is automatically satisfied. Accordingly, a resistance value is determined as expressed by Equation 3 considering only the second condition.

$$16 \times \{R_4/(R_3+R_4)\} < 5 < 17 \times \{R_4/(R_3+R_4)\} \qquad \text{[Equation 3]}$$

To organize Equation 3, $5/17 < R_4/(R_3+R_4) < 5/16$.

Accordingly, a resistance value is determined and the circuit is configured through aforementioned Equation 2 and Equation 3, so that it is possible to monitor a state of the input power.

According to the power-up sequence control system of the present invention, the number of components may be decreased through one DC/DC converter in which four channel outputs are available, thereby decreasing cost of a system and minimizing a size of the system.

It is also possible to handle a change in the power-up sequence without a large change in a circuit or a configuration, thereby improving re-usability and design reliability of the circuit.

A state of the input power may be monitored through the comparator, so that the monitored state may be utilized during a diagnosis of failure.

While the power-up sequence control system of the present invention has been described with reference to the exemplary embodiments of the present invention, but the scope of the present invention is not limited to the aforementioned exemplary embodiment, and it is apparent to those skilled in the art that modifications, changes, and various modified exemplary embodiments are available without departing from the scope of the spirit of the present invention.

What is claimed is:

1. A system for controlling a power-up sequence, comprising:
   one DC/DC converter configured to convert a first input voltage of input power and output the converted first input voltage as a first output voltage on a first output terminal of four output terminals; and
   a comparator block including two comparators each configured to compare a state of the input power to the first output voltage, and one or more comparators configured to generate at least one control signal, for enabling at least a second output terminal of the four output terminals, from the first output voltage.

2. The system of claim 1, wherein the one or more comparators generating the at least one control signal comprises three comparators.

3. The system of claim 1, wherein a first comparator of the one or more comparators configured to generate the at least one control signal from the first output voltage outputs an output value HIGH in response to the first output voltage being applied to a positive (+) terminal and a negative (−) terminal of the first comparator being set to have a voltage smaller than a reference voltage range of the first output voltage, and the output value HIGH is provided to the DC/DC converter as the control signal for enabling the at least a second output terminal.

4. The system of claim 3, wherein a resistance value of the negative (−) terminal of the first comparator is calculated by an equation {first input voltage×{resistance adjacent to first input voltage/(resistance adjacent to first input voltage+resistance adjacent to ground)}<first output voltage}, and the first output voltage is a value obtained by subtracting 0.2 to 0.3 V from the actual first output voltage.

5. The system of claim 4, wherein the resistance adjacent to the ground is selected to have a largest value while being close to the equation.

6. The system of claim 1, wherein whether the input power is lower than a reference voltage input range is monitored through a first comparator of the two comparators configured to compare a state of the input power to the first output voltage.

7. The system of claim 6, wherein in response to the first input voltage dropping below the reference voltage input range, an under voltage signal is LOW (0) to indicate that the state of the input power is abnormal.

8. The system of claim 7, wherein a condition for determining that the state of the input power is abnormal is that when the first input voltage is equal to or larger than a minimum value of the reference voltage, a voltage of the positive (+) terminal of the first comparator is set to be larger than the first output voltage, and when the first input voltage is smaller than the minimum value of the reference voltage, a voltage of the positive (+) terminal of the first comparator is set to be smaller than the first output voltage.

9. The system of claim 1, wherein a dual-purpose comparator is a first comparator of the one or more comparators configured to generate the at least one control signal and is a second comparator of the two comparators configured to compare the state of the input power to the first output voltage, and the dual-purpose comparator monitors whether the input power exceeds a reference voltage input range.

10. The system of claim 9, wherein the dual-purpose comparator generates a first control signal of the at least one control signal and, in response to the first control signal being HIGH (1), it is determined that the input power is normally input, and in response to the first control signal being LOW (0), it is determined that the input power exceeds the reference range.

11. The system of claim 10, wherein a condition for determining that the input power exceeds the reference range is that when the first input voltage exceeds a maximum value of a reference voltage, a voltage value of a negative (−) terminal of the dual-purpose comparator is set to be larger than the first output voltage, and when the first input voltage is equal to or smaller than the maximum value of the reference voltage, a voltage value of the negative (−) terminal of the dual-purpose comparator is set to be smaller than the first output voltage.

12. The system of claim 1, wherein a first control signal of the one or more control signals is generated by a first comparator of the one or more comparators and is input to the DC/DC converter to enable the second output terminal of the DC/DC converter.

13. A system for controlling a power-up sequence, comprising:
    a DC/DC converter configured to convert a first input voltage of input power to a first output voltage and including four output terminals outputting different output voltage according to respective enable control signals;
    a comparator block including a first comparator configured to monitor a state of the input power by a comparison to the first output voltage, a second comparator configured to generate a first enable control signal of the respective enable control signals for outputting a second output voltage from the DC/DC converter by a comparison to the first output voltage, a third comparator configured to generate a second enable control signal of the respective enable control signals for outputting a third output voltage from the DC/DC converter by a comparison to the second output voltage, and a fourth comparator configured to generate a third enable control signal of the respective enable control signals for outputting a fourth output voltage from the DC/DC converter by a comparison to the third output voltage.

14. The system of claim 13, wherein the first enable control signal output by the second comparator is inputted into the DC/DC converter to enable output of the second output voltage, the second enable control signal output by the third comparator is inputted into the DC/DC to enable output of the of the third output voltage, and the third enable control signal output by the fourth comparator is inputted into the DC/DC converter to enable output of the fourth output voltage.

15. The system of claim 14, wherein the first output voltage, the second output voltage, the third output voltage and the fourth output voltage are inputted into a digital signal processor (DSP).

16. The system of claim 12, wherein a second control signal of the one or more control signals is generated by a second comparator of the one or more comparators and is input to the DC/DC converter to enable a third output terminal of the DC/DC converter, and
    a third control signal of the one or more control signals is generated by a third comparator of the one or more comparators and is input to the DC/DC converter to enable a fourth output terminal of the DC/DC converter.

* * * * *